US009294174B2

(12) United States Patent
Broyde et al.

(10) Patent No.: US 9,294,174 B2
(45) Date of Patent: Mar. 22, 2016

(54) METHOD AND DEVICE FOR RADIO RECEPTION USING A PLURALITY OF ANTENNAS AND A MULTIPLE-INPUT-PORT AND MULTIPLE-OUTPUT-PORT AMPLIFIER

(71) Applicant: Samsung Electronics Co., Ltd., Suwon-si, Gyeonggi-do (KR)

(72) Inventors: Frederic Broyde, Maule (FR); Evelyne Clavelier, Maule (FR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/535,704

(22) Filed: Nov. 7, 2014

(65) Prior Publication Data

US 2015/0063486 A1  Mar. 5, 2015

Related U.S. Application Data

(63) Continuation of application No. PCT/IB2013/060481, filed on Nov. 28, 2013.

(30) Foreign Application Priority Data

Mar. 21, 2013  (FR) ..................................... 13 00665

(51) Int. Cl.
*H04B 1/18*         (2006.01)
*H04B 7/04*         (2006.01)
*H01Q 21/00*        (2006.01)
*H01Q 3/40*         (2006.01)
*H04B 7/08*         (2006.01)

(52) U.S. Cl.
CPC ............... *H04B 7/0473* (2013.01); *H01Q 3/40* (2013.01); *H01Q 21/0006* (2013.01); *H04B 1/18* (2013.01); *H04B 7/0837* (2013.01)

(58) Field of Classification Search
CPC ..... H04F 1/3247; H03F 1/324; H04L 27/368; H04B 1/00
See application file for complete search history.

(56) References Cited

U.S. PATENT DOCUMENTS 7,642,849 B2  1/2010 Broyde et al.
7,940,119 B2  5/2011 Broyde et al.
(Continued)

FOREIGN PATENT DOCUMENTS

FR   2902946 B1   8/2008
FR   2896360 B1   10/2008
(Continued)

OTHER PUBLICATIONS

R.A. Speciale, "Advanced Design of Phased-Array Beam-Forming Networks", IEEE Antennas & Propagation Magazine, vol. 38, No. 4, pp. 22-34, Aug. 1996.
(Continued)

*Primary Examiner* — Jaison Joseph
(74) *Attorney, Agent, or Firm* — Jefferson IP Law, LLP

(57) ABSTRACT

The invention relates to a method for radio reception using a plurality of antennas and a multiple-input-port and multiple-output-port amplifier. The invention also relates to a receiver for radio communication using this method. The receiver for radio communication comprises: four antennas; a multiple-input-port and multiple-output-port amplifier comprising adjustable impedance devices, each of the adjustable impedance devices having a reactance at a frequency, the reactance of any one of the adjustable impedance devices being adjustable by electrical means; four analog processing and conversion circuits; a multiple-input signal processing device delivering a signal to a destination, the multiple-input signal processing device delivering a tuning instruction; and a tuning control unit, the tuning control unit receiving the tuning instruction from the multiple-input signal processing device, the tuning control unit delivering tuning control signals to the multiple-input-port and multiple-output-port amplifier as a function of the tuning instruction.

13 Claims, 6 Drawing Sheets

(56) References Cited

U.S. PATENT DOCUMENTS

| | | | |
|---|---|---|---|
| 7,983,645 B2 | 7/2011 | Broyde et al. | |
| 8,059,058 B2 | 11/2011 | Lau et al. | |
| 8,102,830 B2 * | 1/2012 | Yokoi et al. | 370/339 |
| 2008/0116976 A1 * | 5/2008 | Chang et al. | 330/279 |
| 2008/0129610 A1 | 6/2008 | Tsfati et al. | |
| 2010/0201598 A1 * | 8/2010 | Lau et al. | 343/861 |
| 2010/0244948 A1 * | 9/2010 | Broyde et al. | 330/124 R |
| 2010/0248673 A1 * | 9/2010 | Broyde et al. | 455/278.1 |

FOREIGN PATENT DOCUMENTS

| | | |
|---|---|---|
| FR | 2904165 B1 | 11/2008 |
| WO | WO2008/030165 A1 | 3/2008 |

OTHER PUBLICATIONS

J.W. Wallace et al., "Termination-Dependent Diversity Performance of Coupled Antennas: Network Theory Analysis", IEEE Transactions on Antennas and Propagation, vol. 52, No. 1, pp. 98 to 105, Jan. 2004.

"Dictionnaire CEI multilingue de l'électricité—IEC multilingual dictionary of electricity", published by the "Bureau Central de la Commission Electrotechnique Internationale", 1983.

Search report for French Patent Application No. 13/00665, dated Oct. 18, 2013.

Search report for International Application No. PCT/IB2013/060481, dated Mar. 18, 2014.

R.A. Speciale, "Advanced Design of Phased Array Beam-Forming Networks", Proceedings 2005 IEEE Antennas & Propagation Society Symposium, Jul. 2005.

* cited by examiner

METHOD AND DEVICE FOR RADIO RECEPTION USING A PLURALITY OF ANTENNAS AND A MULTIPLE-INPUT-PORT AND MULTIPLE-OUTPUT-PORT AMPLIFIER

CROSS REFERENCE TO RELATED APPLICATIONS

This is a Continuation Application of PCT application No. PCT/IB2013/060481, filed 28 Nov. 2013, published in English under No. WO 2014/147458, which in turn claims priority to French patent application No. 13/00665 of 21 Mar. 2013, entitled "Procédé et dispositif pour la réception radio utilisant une pluralité d'antennes et un amplificateur à accès d'entrée multiples et accès de sortie multiples", both of which are incorporated herein by reference.

FIELD OF THE INVENTION

The invention relates to a method for radio reception using a plurality of antennas and a multiple-input-port and multiple-output-port amplifier. The invention also relates to a receiver for radio communication using a plurality of antennas and a multiple-input-port and multiple-output-port amplifier. The received radio signals may carry information of any nature, for instance signals for speech transmission and/or image transmission (television) and/or data transmission. The received radio signals may be used for any type of operation, for instance broadcasting, bidirectional point-to-point radio communication or radio communication in a cellular network.

PRIOR ART

FIG. 1 shows an example of a block diagram of a modern receiver for radio communication using a plurality of antennas simultaneously. Each of the 3 antennas (1) is coupled to the input of a single-input and single-output low-noise amplifier (4). The output of each single-input and single-output low-noise amplifier (4) is connected to the input of an analog processing and conversion circuit (5) which outputs digital signals. The output of each analog processing and conversion circuit (5) is connected to an input of a multiple-input signal processing device (6), whose output is connected to the destination (7). For instance, in the case of a superheterodyne receiver, each analog processing and conversion circuit (5) may implement the following main steps: frequency conversion, filtering and amplification of the intermediate frequency signal, demodulation and analog-to-digital conversion of the I and Q signals. For example, the multiple-input signal processing device (6) may implement the following main steps: OFDM demodulation of each input signal, space-time decoding, channel decoding, source decoding. In the case where the receiver of FIG. 1 is used with transmitters using also a plurality of antennas, the space-time decoding step is sometimes called MIMO decoding.

The impedance matrix $Z_{ANT}$ of a multiport antenna array is non-diagonal when the interactions between the antennas are non-negligible, the absolute values of the non-diagonal entries of the impedance matrix being generally larger when the antennas are placed closer to each other. It is well known that an antenna array used for receiving radio signals delivers a maximum power when it sees a load presenting an impedance matrix equal to $Z_{ANT}^*$, where $Z_{ANT}^*$ is the hermitian adjoint of $Z_{ANT}$, that is to say a matrix equal to the matrix transpose of the matrix complex conjugate of $Z_{ANT}$. In this case, maximum power transfer occurs.

In the receiver for radio communication using a plurality of antennas shown in FIG. 1, we note that the electrical circuits of the single-input and single-output low-noise amplifiers (4) and of the analog processing and conversion circuits (5) make up as many independent analog channels as there are antennas. Thus, the antenna array sees a load presenting a diagonal impedance matrix. As a consequence, if the antennas form an antenna array in which one or more interactions between the antennas cannot be neglected, a maximum power transfer and/or optimum signal to noise ratios at the inputs of the analog processing and conversion circuits (5) cannot be obtained using the receiver for radio communication using a plurality of antennas shown in FIG. 1, because in this case $Z_{ANT}$ is non-diagonal. This is a first limitation of the receiver shown in FIG. 1, if one wishes to use a compact antenna array.

When the antennas are placed close to each other, the open-circuit voltages received by the antennas become strongly correlated. In the receiver shown in FIG. 1, this phenomenon decreases the transmission rate which can be achieved. This is a second limitation of the receiver shown in FIG. 1, if one wishes to use a compact antenna array.

The article of R. A. Speciale entitled "Advanced Design of Phased-Array Beam-Forming Networks", published in the journal *IEEE Antennas & Propagation Magazine,* vol. 38, No. 4, pages 22 to 34, in August 1996, and the article of J. W. Wallace and M. A. Jensen entitled "Termination-Dependent Diversity Performance of Coupled Antennas: Network Theory Analysis", published in the journal *IEEE Transactions on Antennas and Propagation,* vol. 52, No. 1, pages 98 to 105, in January 2004, show that radio reception using several antennas may be improved if one uses a multiple-input-port and multiple-output-port passive linear matching network, having its input terminals connected to the coupled antennas and its output terminals connected to uncoupled loads, provided the multiple-input-port and multiple-output-port passive linear matching network has appropriate characteristics.

FIG. 2 shows an example of a block diagram of a receiver for radio communication using a plurality of antennas and such a multiple-input-port and multiple-output-port passive linear matching network. Each of the 3 antennas (1) is coupled, directly or through a feeder, to an input port of the multiple-input-port and multiple-output-port passive linear matching network (2). Each of the output ports of the multiple-input-port and multiple-output-port passive linear matching network (2) is connected to the input of a single-input and single-output low-noise amplifier (4). In FIG. 2, the analog processing and conversion circuits (5) and the multiple-input signal processing device (6) are used as in FIG. 1 to produce the signal delivered to the destination (7). In the receiver shown in FIG. 2, it is possible to obtain a maximum power transfer, signal decorrelation and optimum signal to noise ratios at the inputs of the analog processing and conversion circuits (5). However, these wanted results are sensitive to a good fit between the value of $Z_{ANT}$ and the characteristics of the multiple-input-port and multiple-output-port passive linear matching network (2). Unfortunately, the value of $Z_{ANT}$ varies, in particular when the frequency of operation is modified within a frequency band of intended operation, or when the electromagnetic characteristics of the volume surrounding the antennas are modified, for instance a movement of the hand of the user of a portable phone. Thus, the receiver shown in FIG. 2 does not effectively overcome the limitations of the receiver shown in FIG. 1.

An "antenna system" disclosed in the international application number PCT/SE2007/000776 (WO2008/030165) and in U.S. Pat. No. 8,059,058, both entitled "Antenna system and method for operating an antenna system" and both invented by B. K. Lau and J. Bach Andersen, is primarily defined as comprising N antennas, where N is an integer greater than or equal to 2, and an "impedance matching network", the "impedance matching network" having N input ports and N output ports, the "impedance matching network" being characterized in that it is adaptive.

According to the "Dictionnaire CEI multilingue de l'électricité—IEC multilingual dictionary of electricity" published by the "Bureau Central de la Commission Electrotechnique Internationale" in 1983, the meaning of "adaptive" in electronics is: "whose characteristics are time-variable and result from the optimization of some operational conditions or process". It is important to note that said international application number PCT/SE2007/000776 and U.S. Pat. No. 8,059,058 use the word "adaptive" with two different meanings: the meaning indicated above, and another meaning which seems to be synonymous with "controllable". We are interested in the case where the "impedance matching network" is controlled as a function of a control signal based on at least one channel parameter of the signals received by the antennas. Said at least one channel parameter of the signals received by the antennas is for instance a measure of a correlation between open-circuit voltages delivered by the antennas. Such a channel parameter is not used elsewhere in a radio receiver using the antenna system. Thus, this approach has the major drawback that dedicated circuits and intensive dedicated signal processing are needed to obtain said at least one channel parameter of the signals received by the antennas, which implies added cost and added power consumption.

At a given frequency, an electronic circuit "A" comprising a port having a linear characteristic may be such that this port presents any impedance, that is to say an impedance taking on any value in the set of complex numbers. However, the specialist understands that if the electronic circuit "A" is passive in the meaning of circuit theory, said impedance is such that its real part is positive or zero. In a similar way, an electronic circuit "B" comprising N ports having linear characteristics may be such that these ports present any impedance matrix, that is to say an impedance matrix, denoted by Z, taking on any value in the set of N by N complex matrices. However, the specialist understands that if the electronic circuit "B" is passive in the meaning of circuit theory, said impedance matrix is such that $Z+Z^*$ is an hermitian matrix whose eigenvalues are positive or zero, where $Z^*$ is the hermitian adjoint of Z. Said international application number PCT/SE2007/000776 and U.S. Pat. No. 8,059,058 indicate a desirable property of the "impedance matching network": being "arranged to realize any N by N impedance matrix, as seen from the antenna ports", to obtain a "full implementation of the antenna system". The specialist understands that some of these impedance matrices imply that, when the antennas are used for radio reception, the antennas receive radio-frequency power from the "impedance matching network". Of course, any one of said some of these impedance matrices, denoted by Z, is such that $Z+Z^*$ is an hermitian matrix having one or more strictly negative eigenvalues. The prior art, however, does not teach how to build an "impedance matching network" having this property, and said international application number PCT/SE2007/000776 and U.S. Pat. No. 8,059,058 provide no indication on the type of circuit which can be used to realize the "impedance matching network".

FIG. 3 shows an example of a block diagram of a receiver for radio communication using a plurality of antennas and a multiple-input-port and multiple-output-port amplifier, disclosed in the French patent number 0606502, entitled "Procédé et dispositif pour la réception radioélectrique utilisant une pluralité d'antennes", corresponding to the U.S. Pat. No. 7,983,645 entitled "Method and device for radio reception using a plurality of antennas". In FIG. 3, the receiver for radio communication comprises 4 antennas (1) connected to the input ports of a multiple-input-port and multiple-output-port amplifier (3) having 4 input ports and 4 output ports. Each output port of the multiple-input-port and multiple-output-port amplifier (3) is connected to the input of an analog processing and conversion circuit (5) which outputs digital signals. The output of each analog processing and conversion circuit is connected to an input of a multiple-input signal processing device (6), whose output is connected to the destination (7). In the receiver shown in FIG. 3, it is possible to obtain a maximum power transfer, a signal decorrelation and optimum signal to noise ratios at the inputs of the analog processing and conversion circuits. However, these wanted results are sensitive to a good fit between the value of $Z_{ANT}$ and the characteristics of the multiple-input-port and multiple-output-port amplifier, so that the receiver shown in FIG. 3 does not effectively overcome the limitations of the receiver shown in FIG. 1.

A different approach is disclosed in the U.S. Pat. No. 8,102,830 entitled "MIMO Radio Communication Apparatus and Method" (inventors: A. Yokoi and T. Mitsui). The invention described in this patent is shown in FIG. 4, where 4 antenna systems (10) each have an antenna output which is coupled to the input of a single-input and single-output low-noise amplifier (4). The output of each single-input and single-output low-noise amplifier (4) is connected to the input of an analog processing and conversion circuit (5) which outputs digital signals. The output of each analog processing and conversion circuit (5) is connected to an input of a multiple-input signal processing device (6).

An antenna system (10) typically comprises a main antenna which is connected to the antenna output of the antenna system, and two or more auxiliary antennas. Each of the auxiliary antennas is connected to an adjustable impedance device, each of the adjustable impedance devices having a reactance at a frequency in a frequency band of operation, the reactance of any one of the adjustable impedance devices being adjustable by electrical means. The specialist understands that each of the antenna systems (10) behaves as a single antenna having a radiation pattern which is adjustable by electrical means. This radiation pattern may be referred to as the radiation pattern of said each of the antenna systems (10).

In FIG. 4, the multiple-input signal processing device (6) processes 4 digital signals, each of the digital signals being mainly determined by one and only one of the signals delivered by the antenna outputs, and delivers a signal to a destination (7). The multiple-input signal processing device (6) estimates a channel matrix between a plurality of signals sent by a transmitter and the 4 signals delivered by the antenna outputs of the antenna systems, the multiple-input signal processing device delivering "radiation pattern instructions" as a function of the estimated channel matrix.

The 4 antenna control units (8) shown in FIG. 4 receive the radiation pattern instructions from the multiple-input signal processing device (6), each of the antenna control units (8) delivering one or more "radiation pattern control signals" to one of the antenna systems (10) as a function of the radiation pattern instructions, the reactance of one or more of the adjustable impedance devices of said one of the antenna systems (10) being mainly determined by one or more of the radiation pattern control signals.

The specialist understands that:

the radiation pattern of each of the antenna systems (10) is mainly determined by one or more of the radiation pattern control signals, each of the radiation pattern control signals being determined as a function of said channel matrix;

the channel matrix depends on the radiation pattern of each of the antenna systems (10) and therefore on the radiation pattern control signals;

the receiver shown in FIG. 4 is adaptive in the sense that a nonlinear feedback loop exists, which determines the radiation pattern control signals, and consequently the radiation pattern of each of the antenna systems (10).

In the invention disclosed in said U.S. Pat. No. 8,102,830, the channel matrix is used to compute a channel capacity corresponding to a combination of radiation patterns of the plurality of antenna systems, or equivalently to a combination of radiation pattern control signals. The adaptive process is the following: during a training sequence (also referred to as "pilot sequence"), the channel capacity is computed in this way for a finite set of combinations of radiation pattern control signals, and a combination of radiation pattern control signals providing the greatest channel capacity is selected.

The specialist understands that the invention disclosed in said U.S. Pat. No. 8,102,830 may provide signal decorrelation using an adaptive scheme which may give good results when the frequency of operation is modified within a frequency band of intended operation, or when the electromagnetic characteristics of the volume surrounding the antennas are modified. Unfortunately, this invention cannot be used to obtain a maximum power transfer or optimum signal to noise ratios when the interactions between the antennas are non-negligible, because it requires a wide spacing between the different antenna systems, and it is expensive because, if each antenna system shown in FIG. 4 comprises a main antenna and two auxiliary antennas, 12 antennas are used.

SUMMARY OF THE INVENTION

The purpose of the invention is a method and a receiver for radio reception using a plurality of antennas and a multiple-input-port and multiple-output-port amplifier without the above-mentioned limitations of known techniques.

The method of the invention for radio reception with multiple antennas in a given frequency band, using N antennas, where N is an integer greater than or equal to 2, comprises the steps of:

amplifying n electrical signals, where n is an integer greater than or equal to 2 and less than or equal to N, using a multiple-input-port and multiple-output-port amplifier comprising n input ports, m output ports, where m is an integer greater than or equal to 2, and p adjustable impedance devices, where p is an integer greater than or equal to m, each of the adjustable impedance devices having a reactance at a frequency in said given frequency band, the input ports presenting, at said frequency in said given frequency band, an admittance matrix referred to as "the admittance matrix presented by the input ports", the reactance of any one of the adjustable impedance devices having an influence on the admittance matrix presented by the input ports, the reactance of any one of the adjustable impedance devices being adjustable by electrical means, each of the output ports delivering a signal;

processing m digital signals, each of the digital signals being mainly determined by one and only one of the signals delivered by the output ports, to estimate one or more quantities representative of a channel matrix between a plurality of signals sent by a transmitter and the m signals delivered by the output ports, and to deliver a "tuning instruction" as a function of said one or more quantities representative of a channel matrix;

using the tuning instruction to obtain one or more "tuning control signals", the reactance of each of the adjustable impedance devices being mainly determined by one or more of the tuning control signals.

An adjustable impedance device is a component comprising two terminals which substantially behave as a passive linear two-terminal circuit element, and which are consequently fully characterized by an impedance which may depend on frequency, this impedance being adjustable. An adjustable impedance device may be adjustable by mechanical means, for instance a variable resistor, a variable capacitor, a network comprising a plurality of capacitors and one or more switches or change-over switches used to cause different capacitors of the network to contribute to the reactance, a variable inductor, a network comprising a plurality of inductors and one or more switches or change-over switches used to cause different inductors of the network to contribute to the reactance, or a network comprising a plurality of open-circuited or short-circuited stubs and one or more switches or change-over switches used to cause different stubs of the network to contribute to the reactance. We note that all examples in this list, except the variable resistor, are intended to provide an adjustable reactance.

An adjustable impedance device having a reactance which is adjustable by electrical means may be such that it only provides, at said frequency in said given frequency band, a finite set of reactance values, this characteristic being for instance obtained if the adjustable impedance device is:

a network comprising a plurality of capacitors or open-circuited stubs and one or more electrically controlled switches or change-over switches, such as electro-mechanical relays, or microelectromechanical switches (MEMS switches), or PIN diodes or insulated-gate field-effect transistors (MOSFETs), used to cause different capacitors or open-circuited stubs of the network to contribute to the reactance; or a network comprising a plurality of coils or short-circuited stubs and one or more electrically controlled switches or change-over switches used to cause different coils or short-circuited stubs of the network to contribute to the reactance.

An adjustable impedance device having a reactance which is adjustable by electrical means may be such that it provides, at said frequency in said given frequency band, a continuous set of reactance values, this characteristic being for instance obtained if the adjustable impedance device is based on the use of a variable capacitance diode; or a MOS varactor; or a microelectromechanical varactor (MEMS varactor); or a ferroelectric varactor.

According to the invention, each of the input ports may be coupled, directly or indirectly, to one and only one of the N antennas. The specialist understands that an indirect coupling between one of the input ports and one and only one of the N antennas may be a coupling through any one of, or any combination of, the devices commonly inserted between an antenna and an antenna input of a receiver, for instance a coupling through a feeder and/or a transmit/receive switch (also referred to as "T/R switch") and/or a duplexer.

The specialist understands that said one or more quantities representative of a channel matrix may for instance be an estimation of instantaneous channel state information (CSI), which may for instance be obtained using a training sequence (or pilot sequence) and/or a decision directed channel estimation. In the case of a training sequence, known signals are sent by a transmitter and the channel matrix is estimated using the knowledge of the signals sent by the transmitter and of the noisy signals delivered by the output ports.

The specialist understands that:

the admittance matrix presented by the input ports may be modified by said one or more tuning control signals, each of the tuning control signals being determined as a function of said one or more quantities representative of a channel matrix;

like the channel matrix, said one or more quantities representative of a channel matrix depend on the admittance matrix presented by the input ports and therefore on the tuning control signals;

the method of the invention is adaptive in the sense that a nonlinear feedback loop exists, which determines the tuning control signals, and consequently the admittance matrix presented by the input ports.

The specialist understands that this feedback loop may for instance provide a maximum power transfer, a signal decorrelation or a maximum channel capacity.

A receiver implementing the method of the invention is a receiver for radio reception with multiple antennas using N antennas in a given frequency band, where N is an integer greater than or equal to 2, comprising:

a multiple-input-port and multiple-output-port amplifier comprising n input ports, where n is an integer greater than or equal to 2 and less than or equal to N, m output ports, where m is an integer greater than or equal to 2, and p adjustable impedance devices, where p is an integer greater than or equal to m, each of the adjustable impedance devices having a reactance at a frequency in said given frequency band, the input ports presenting, at said frequency in said given frequency band, an admittance matrix referred to as "the admittance matrix presented by the input ports", the reactance of any one of the adjustable impedance devices having an influence on the admittance matrix presented by the input ports, the reactance of any one of the adjustable impedance devices being adjustable by electrical means, each of the output ports delivering a signal;

a multiple-input signal processing device processing m digital signals, each of the digital signals being mainly determined by one and only one of the signals delivered by the output ports, the multiple-input signal processing device estimating one or more quantities representative of a channel matrix between a plurality of signals sent by a transmitter and the m signals delivered by the output ports, the multiple-input signal processing device delivering a "tuning instruction" as a function of said one or more quantities representative of a channel matrix;

a tuning control unit, the tuning control unit receiving the tuning instruction from the multiple-input signal processing device, the tuning control unit delivering one or more "tuning control signals" to the multiple-input-port and multiple-output-port amplifier, the tuning control signals being determined as a function of the tuning instruction, the reactance of each of the adjustable impedance devices being mainly determined by one or more of the tuning control signals.

The specialist understands that the multiple-input signal processing device can also be used to deliver a signal to a destination.

The specialist understands that a SIMO or MIMO channel exists between the plurality of signals sent by the transmitter and the m signals delivered by the output ports. The specialist understands that said one or more quantities representative of a channel matrix may for instance be used to determine a quantity representative of a channel capacity. The specialist understands that this channel capacity is the capacity of said SIMO or MIMO channel. In this case, said tuning instruction may for instance be determined as being the tuning instruction which, among a set of possible tuning instructions, produces a quantity representative of a channel capacity which corresponds to the largest channel capacity.

The specialist understands that many characteristics of the multiple-input-port and multiple-output-port amplifier depend on the characteristics of a multiport load such that each port of the multiport load is connected to one and only one of said output ports. For instance, the specialist sees that, if the multiport load is linear, said output ports see, at said frequency in said given frequency band, an impedance matrix referred to as "the impedance matrix seen by the output ports", and that the admittance matrix presented by the input ports usually depends on the impedance matrix seen by the output ports. Consequently, the specialist understands that, in this case, the wording "the reactance of any one of the adjustable impedance devices having an influence on the admittance matrix presented by the input ports" implicitly means "the reactance of any one of the adjustable impedance devices having, if the impedance matrix seen by the output ports is equal to a given impedance matrix, an influence on the admittance matrix presented by the input ports". According to the invention, the given impedance matrix may be a diagonal matrix. We note that the admittance matrix presented by the input ports may also be referred to as a "loaded input admittance matrix", that is to say the input admittance matrix obtained in a configuration where each port of a given multiport load is connected to one and only one of said output ports. Of course, if the given multiport load is linear, the impedance matrix of the given multiport load is the given impedance matrix.

According to the invention, the multiple-input-port and multiple-output-port amplifier may, for a given tuning instruction, be such that the admittance matrix presented by the input ports is a non-diagonal square matrix.

According to the invention, the multiple-input-port and multiple-output-port amplifier may, for a given tuning instruction, be such that the admittance matrix presented by the input ports approximates a wanted admittance matrix, the wanted admittance matrix being a non-diagonal and invertible square matrix.

According to the invention, the multiple-input-port and multiple-output-port amplifier may, at said frequency in said given frequency band, for a given tuning instruction, have a voltage gain matrix approximating a specified gain matrix, the specified gain matrix being a non-diagonal square matrix.

BRIEF DESCRIPTION OF THE DRAWINGS

Other advantages and characteristics will appear more clearly from the following description of particular embodiments of the invention, given by way of non-limiting examples, with reference to the accompanying drawings in which.

DETAILED DESCRIPTION OF SOME EMBODIMENTS

First Embodiment

Figure 5:
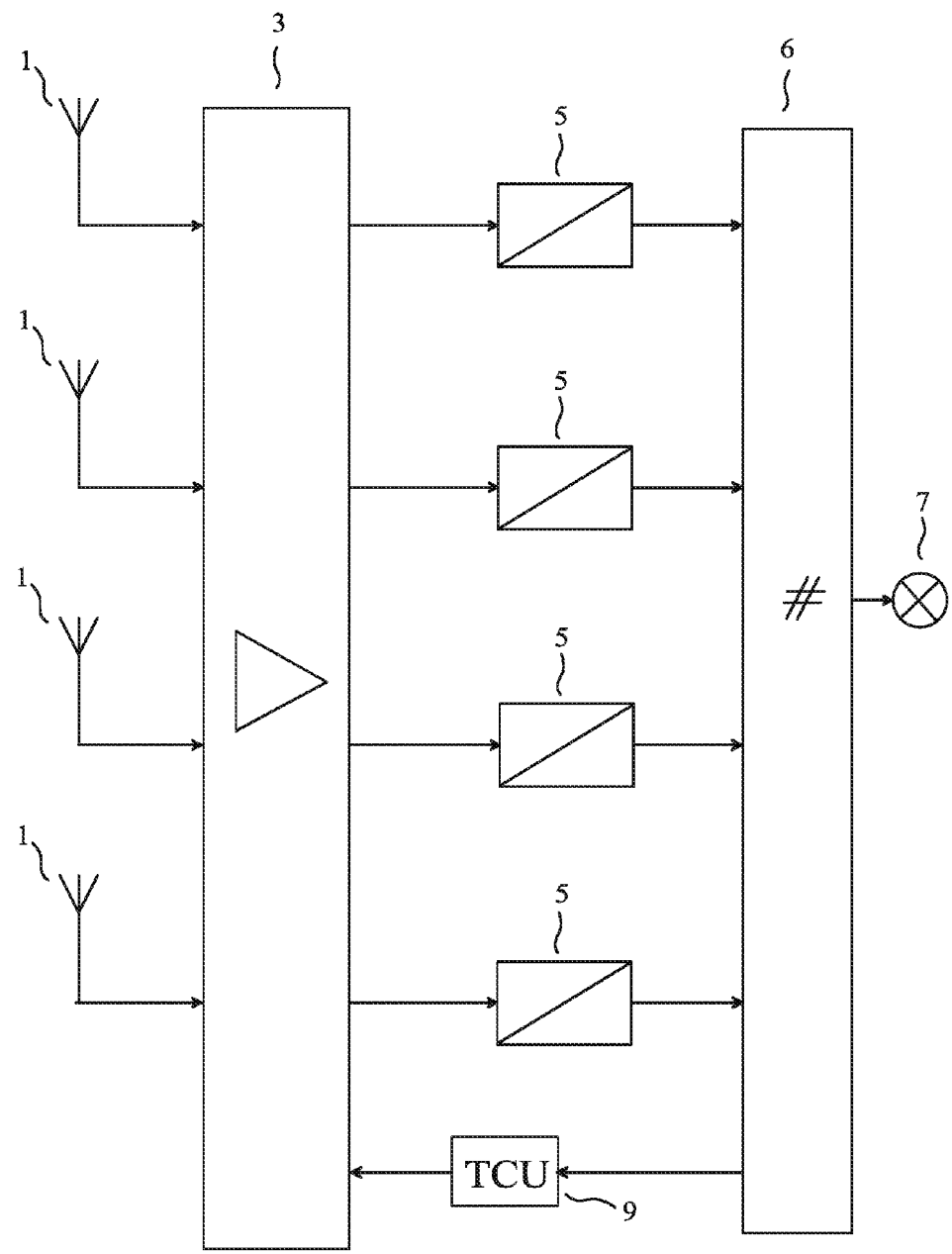
FIG. 5 shows the block diagram of a receiver for radio communication of the invention (first, second and third embodiments)

As a first embodiment of a device of the invention, given by way of non-limiting example, we have represented in FIG. 5 the block diagram of a receiver for radio communication using a plurality of antennas, for receiving in a given frequency band, comprising:

N=4 antennas (1);

a multiple-input-port and multiple-output-port amplifier (3) comprising =4 input ports, m=4 output ports, and p adjustable impedance devices, where p is an integer greater than or equal to m, each of the adjustable impedance devices having a reactance at a frequency in said given frequency band, the input ports presenting, at said frequency in said given frequency band, an admittance matrix referred to as "the admittance matrix presented by the input ports", the reactance of any one of the adjustable impedance devices having an influence on the admittance matrix presented by the input ports, each of the input ports being coupled, directly or through a feeder, to one and only one of the N antennas (1), the reactance of any one of the adjustable impedance devices being adjustable by electrical means, each of the output ports delivering a signal;

m analog processing and conversion circuits (5), each of said output ports being coupled to an input of one of the analog processing and conversion circuits, each of the analog processing and conversion circuits having an output which delivers a digital signal;

a multiple-input signal processing device (6) processing the m digital signals delivered by the outputs of the analog processing and conversion circuits, the multiple-input signal processing device delivering a signal to a destination (7), the multiple-input signal processing device estimating quantities representative of a channel matrix between a plurality of signals sent by a transmitter and the m signals delivered by the output ports, the multiple-input signal processing device computing one or more quantities representative of a channel capacity as a function of said quantities representative of a channel matrix, and delivering a "tuning instruction" as a function of said one or more quantities representative of a channel capacity;

a tuning control unit (9), the tuning control unit receiving the tuning instruction from the multiple-input signal processing device, the tuning control unit delivering a plurality of "tuning control signals" to the multiple-input-port and multiple-output-port amplifier, the tuning control signals being determined as a function of the tuning instruction, the reactance of each of the adjustable impedance devices being determined by one or more of the tuning control signals.

For instance, it is possible that any diagonal entry of the admittance matrix presented by the input ports is influenced by the reactance of at least one of the adjustable impedance devices. For instance, the reactance of at least one of the adjustable impedance devices may have an influence on at least one non-diagonal entry of the admittance matrix presented by the input ports.

According to the invention, m digital signals, each mainly determined by one and only one of the signals delivered by the output ports, are processed to estimate one or more quantities representative of a channel matrix between a plurality of signals sent by a transmitter and the m signals delivered by the output ports, and to deliver a "tuning instruction" as a function of said one or more quantities representative of a channel matrix. The specialist understands that this is completely different from what is disclosed in said international application number PCT/SE2007/000776 and U.S. Pat. No. 8,059,058, where, as said above, a control signal is based on at least one channel parameter of the signals received by the antennas such as a measure of a correlation between open-circuit voltages delivered by the antennas. The specialist sees that the invention uses a feedback control system to determine the "tuning instruction", whereas said international application number PCT/SE2007/000776 and U.S. Pat. No. 8,059,058 use an open-loop control system to determine the control signal, which is much more difficult to implement because it requires an accurate model of the receiver. Thus, the invention overcomes this drawback of the prior art.

Moreover, since assessing one or more quantities representative of the channel matrix between a plurality of signals sent by a transmitter and the m signals delivered by the output ports is needed in closed-loop MIMO reception, the specialist understands that, according to the invention, no additional circuit and little additional signal processing are needed to deliver a "tuning instruction", compared to the circuits and signal processing used in a similar radio receiver which would not implement the invention, the block diagram of which would be identical to the one shown in FIG. 5, except that the tuning control unit (9) and the two corresponding links would not be present. The specialist understands that the opposite situation occurs in the antenna system disclosed in said international application number PCT/SE2007/000776 and U.S. Pat. No. 8,059,058, where, as said above, additional circuits and intensive additional signal processing are needed to obtain said at least one channel parameter of the signals received by the antennas. Thus, the invention overcomes this drawback of the prior art.

The specialist understands that, in order to compute said one or more quantities representative of a channel capacity, the multiple-input signal processing device (6) may estimate at least one quantity representative of a signal to noise ratio of reception. In this first embodiment, the adaptive process is such that, most of the time, the tuning instruction used for reception is a tuning instruction which, among a set of possible tuning instructions, produces values of said one or more quantities representative of a channel capacity which correspond to one of the largest channel capacities (or preferably, to the largest channel capacity).

The receiver for radio transmission with multiple antennas is such that the multiple-input-port and multiple-output-port amplifier produces a reduced noise spectral density.

Let us use $Z_{SANT}$ to denote the impedance matrix seen by the input ports of the multiple-input-port and multiple-output-port amplifier. The specialist understands that $Z_{SANT}$ depends on the impedance matrix of the multiport antenna array made up of said antennas, denoted by $Z_{ANT}$ as above, so that $Z_{SANT}$ depends on the electromagnetic characteristics of the volume surrounding the antennas. In particular, if the multiport antenna array is built in a portable transceiver, for instance a user equipment (UE) of an LTE wireless network, the body of the user has an effect on $Z_{SANT}$, and $Z_{SANT}$ depends on the position of the body of the user. This is referred to as "user interaction", or "hand effect" or "finger effect".

Figure 1:
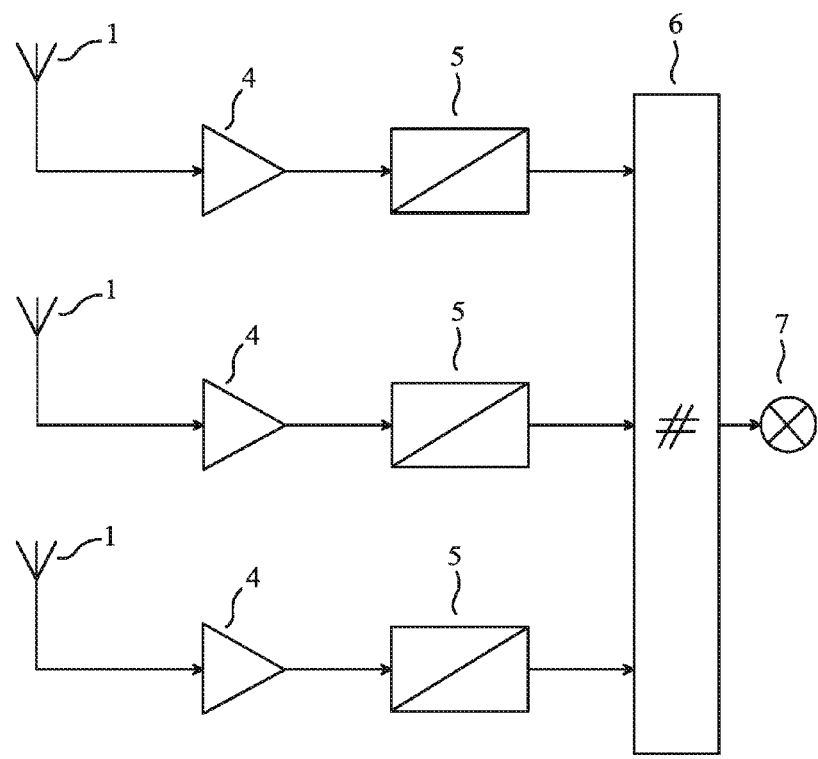
FIG. 1 shows the block diagram of a receiver for radio communication using several antennas, comprising as many independent analog channels as there are antennas, and has already been discussed in the section dedicated to the presentation of the prior art.
Figure 2:
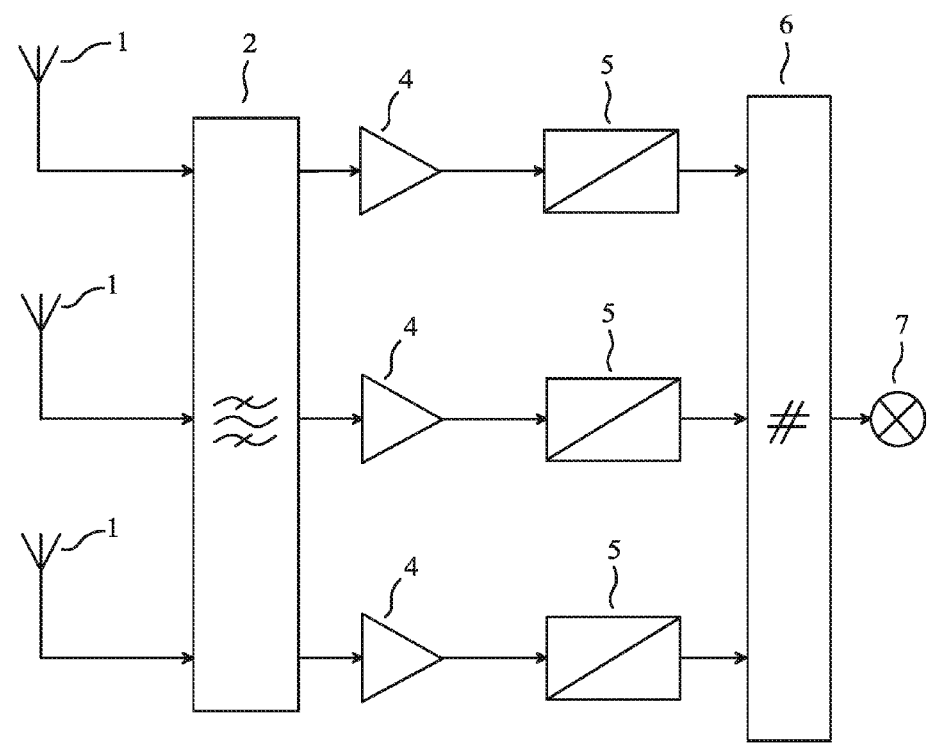
FIG. 2 shows the block diagram of a receiver for radio communication using several antennas, comprising a multiple-input-port and multiple-output-port passive linear matching network, and has already been discussed in the section dedicated to the presentation of the prior art.
Figure 3:
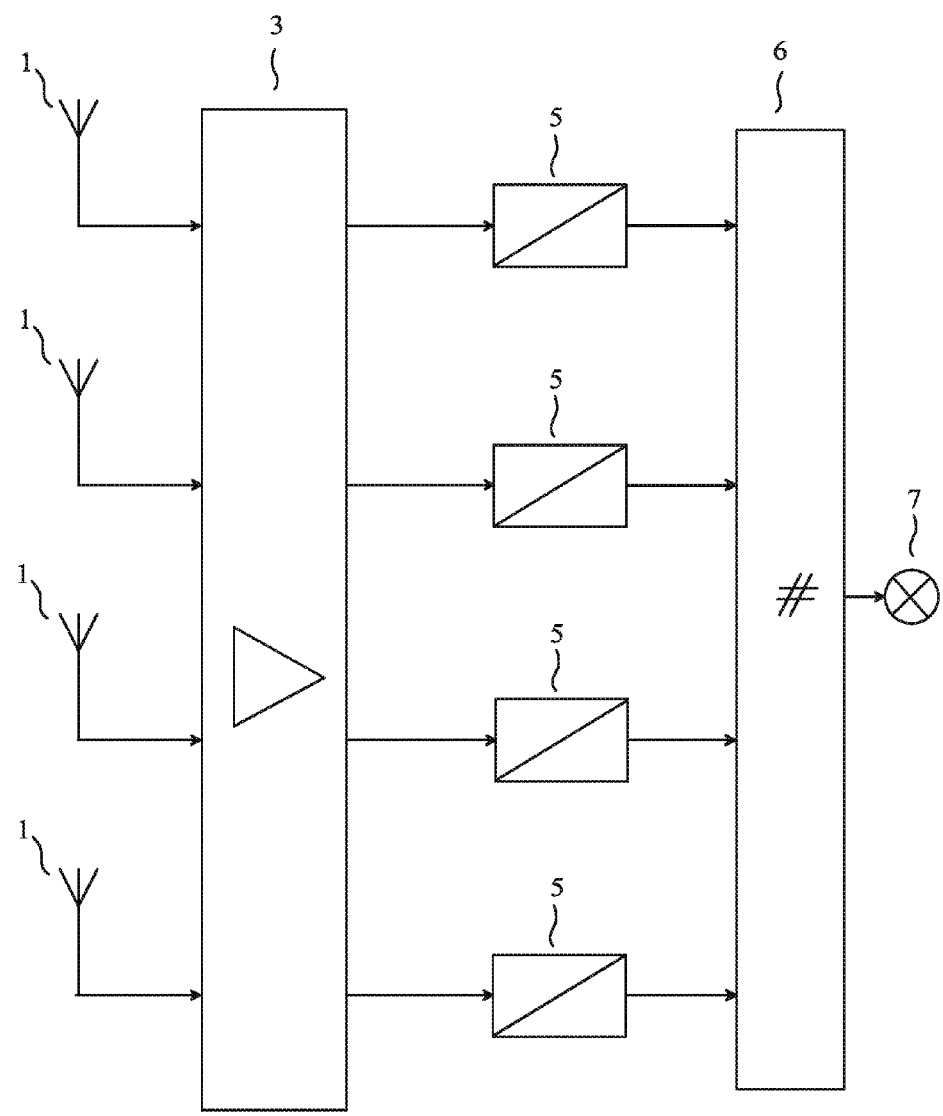
FIG. 3 shows the block diagram of a receiver for radio communication using several antennas, comprising a multiple-input-port and multiple-output-port amplifier, and has already been discussed in the section dedicated to the presentation of the prior art.
Figure 4:
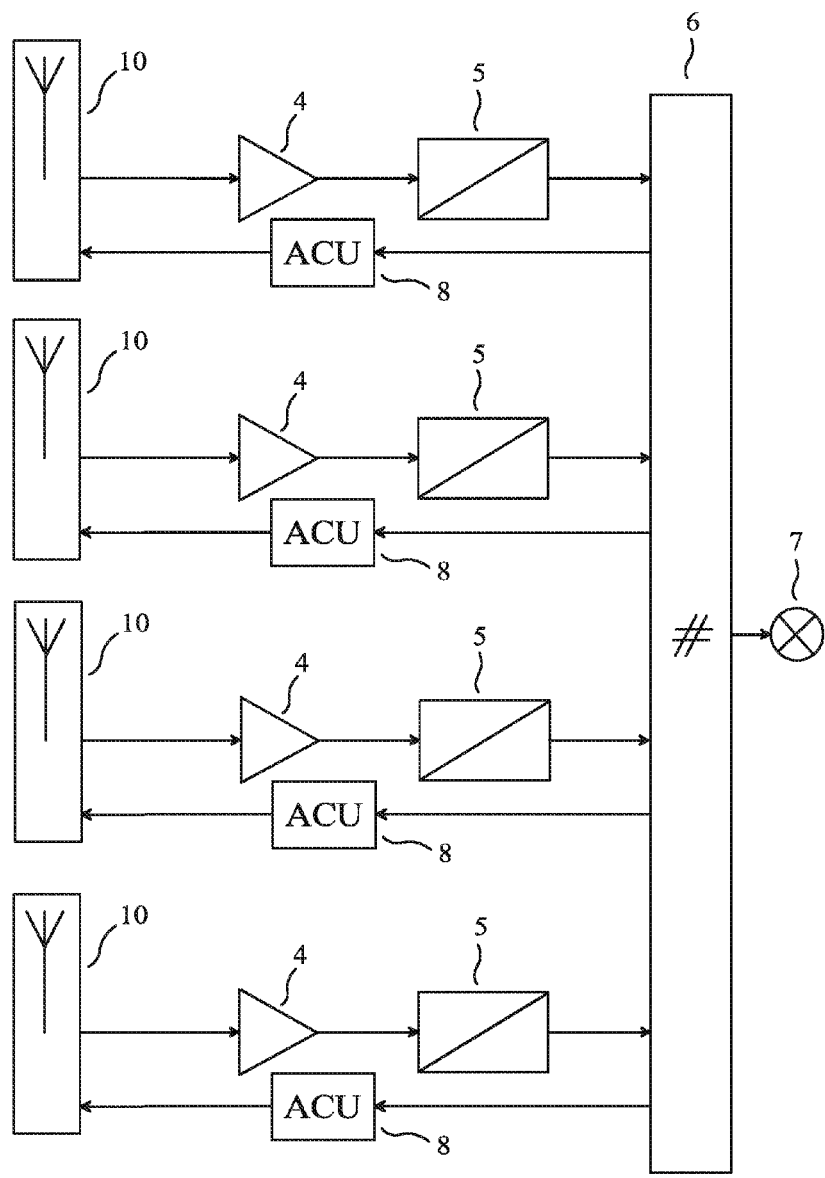
FIG. 4 shows the block diagram of a receiver for radio communication using several antenna systems such that the radiation pattern of each antenna system is adjustable by electrical means, and has already been discussed in the section dedicated to the presentation of the prior art.

In this first embodiment, the antennas (1), the multiple-input-port and multiple-output-port amplifier (3), the analog processing and conversion circuits (5) and the multiple-input signal processing device (6) form a radio receiver disclosed in claim 7 of said U.S. Pat. No. 7,983,645. Thus, the specialist understands that the receiver shown in FIG. 5 may provide a maximum power transfer, a signal decorrelation and optimum signal to noise ratios at the inputs of the analog processing and conversion circuits (5), in spite of variations of $Z_{SANT}$ for instance caused by a variation in the frequency of operation within a frequency band of intended operation, or by the user interaction. Also, the receiver shown in FIG. 5 does not require a large number of antennas or a wide spacing between them like the receiver shown in FIG. 4. Thus, the receiver shown in FIG. 5 effectively overcomes the limitations of the prior art.

Second Embodiment (Best Mode)

The second embodiment of a device of the invention, given by way of non-limiting example and best mode of carrying out the invention, also corresponds to the receiver for radio communication using a plurality of antennas represented in FIG. 5, and all explanations provided for the first embodiment are applicable to this second embodiment. Additionally, in this second embodiment, the multiple-input-port and multiple-output-port amplifier (3) comprises a multiple-input and multiple-output series-series feedback amplifier. This type of amplifier is for instance disclosed in the French patent number 0600388, entitled "Amplificateur à entrées multiples et sorties multiples", corresponding to the U.S. Pat. No. 7,642,849 entitled "Multiple-input and multiple-output amplifier", and in the French patent number 0605633, entitled "Amplificateur à entrées multiples et sorties multiples utilisant l'induction mutuelle dans le réseau de rétroaction", corresponding to the U.S. Pat. No. 7,940,119 entitled "Multiple-input and multiple-output amplifier using mutual induction in the feedback network".

Figure 6:
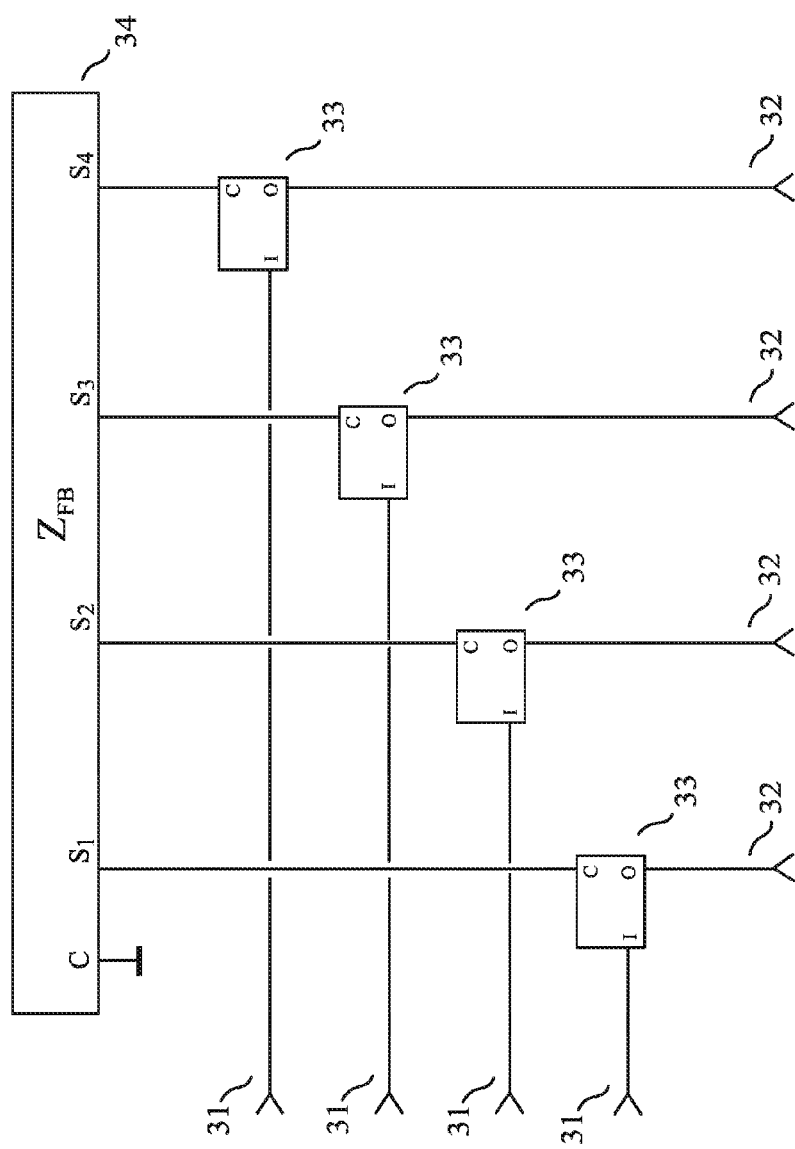
FIG. 6 shows the block diagram of a multiple-input and multiple-output series-series feedback amplifier used in the second embodiment.

More precisely, the multiple-input-port and multiple-output-port amplifier (3) comprises a multiple-input and multiple-output series-series feedback amplifier shown in FIG. 6, comprising 4 signal input terminals (31), 4 active sub-circuits (33), a feedback network (34), and 4 signal output terminals (32). The feedback network has an impedance matrix at said frequency in said given frequency band. The feedback network comprises a plurality of windings, the windings of the feedback network being such that, at said frequency in said given frequency band, the mutual induction between the different windings has a non-negligible influence on one or more non-diagonal entries of the impedance matrix of the feedback network.

The adjustable impedance devices are parts of the feedback network, so that the impedance matrix of the feedback network is adjustable by electrical means. The specialist understands that it is possible to obtain that:

the feedback network produces a negative feedback (degenerative feedback) such that, for a given tuning instruction, the admittance matrix presented by the input ports approximates a wanted admittance matrix, the wanted admittance matrix being a non-diagonal and invertible square matrix;

the feedback network produces a negative feedback such that, at said frequency in said given frequency band, for a given tuning instruction, the multiple-input-port and multiple-output-port amplifier has a voltage gain matrix approximating a specified gain matrix, the specified gain matrix being a non-diagonal square matrix.

In this second embodiment, the adaptive process is implemented during one or more training sequences. The adaptive process is the following: during each of said training sequences, said one or more quantities representative of a channel capacity are computed for a finite set of tuning instructions, and a tuning instruction is selected, the selected tuning instruction being a tuning instruction for which said one or more quantities representative of a channel capacity correspond either to one of the largest channel capacity or, preferably, to the largest channel capacity. The tuning instruction selected during the latest completed training sequence is used for reception.

The reactance of an adjustable impedance device may depend on the ambient temperature, for some types of adjustable impedance devices. If such a type of adjustable impedance device is used in the antenna tuning apparatus, it is desirable that the tuning control signals are determined as a function of the tuning instruction and as a function of temperature, to compensate the effect of temperature on the reactance of each of the adjustable impedance devices.

The specialist understands that any small variation in the impedance matrix of the antenna array, caused by a change in operating frequency or a change in the medium surrounding the antennas, can be partially or totally compensated with a new adjustment of the adjustable impedance devices, obtained automatically thanks to the adaptive process. Thus, it is always possible to obtain a good performance. The specialist understands that the receiver for radio communication of the invention compensates the user interaction.

Third Embodiment

The third embodiment of a device of the invention, given by way of non-limiting example, also corresponds to the receiver for radio communication using a plurality of antennas represented in FIG. 5, and all explanations provided for the first embodiment are applicable to this third embodiment.

In this third embodiment, the multiple-input signal processing device (6) performs correlations between known training sequences which are sent by a transmitter during known time intervals, and the signals delivered by the output ports, to estimate quantities representative of a channel matrix between a plurality of signals sent by a transmitter and the m signals delivered by the output ports. The specialist understands how such a method can be implemented. For instance, said transmitter comprising several transmitting antennas, one of said training sequences may comprise a plurality of quasi-orthogonal or orthogonal signals, each of said quasi-orthogonal or orthogonal signals being used as one of the signals sent by said transmitter, each of said quasi-orthogonal or orthogonal signals being sent through one and only one of said transmitting antennas.

In this third embodiment, the adaptive process is implemented during one or more training sequences. The adaptive process is the following: during each of said training sequences, a channel capacity is computed for a finite set of tuning instructions, and a tuning instruction producing the largest channel capacity is selected. The tuning instruction selected during the latest completed training sequence is used for reception.

INDICATIONS ON INDUSTRIAL APPLICATIONS

The invention is suitable for radio reception using multiple antennas. Thus, the invention is suitable for MIMO radio communication.

The invention provides the best possible characteristics using very close antennas, hence presenting a strong interaction between the antennas. The invention is therefore particularly suitable for mobile reception devices, for instance those used in portable radiotelephones or portable computers.

The invention provides the best possible characteristics using a very large number of antennas in a given volume, hence presenting a strong interaction between the antennas. The invention is therefore particularly suitable for high-performance reception devices, for instance those used in the fixed stations of cellular radiotelephony networks.

A radio receiver of the invention may be used in a device which also comprises a radio transmitter having one or more parts in common with the radio receiver of the invention. For instance, antennas used in a radio receiver of the invention may also be parts of a radio transmitter.

The invention claimed is:

1. A method for radio reception with multiple antennas in a given frequency band, using N antennas, where N is an integer greater than or equal to 2, the method comprising the steps of:
    amplifying n electrical signals, where n is an integer greater than or equal to 2 and less than or equal to N, using a multiple-input-port and multiple-output-port amplifier comprising n input ports, m output ports, where m is an integer greater than or equal to 2, and p adjustable impedance devices, where p is an integer greater than or equal to m, each of the adjustable impedance devices having a reactance at a frequency in the given frequency band, the input ports presenting, at said frequency in the given frequency band, an admittance matrix referred to as the admittance matrix presented by the input ports, the reactance of any one of the adjustable impedance devices having an influence on the admittance matrix presented by the input ports, the reactance of any one of the adjustable impedance devices being adjustable by electrical means, each of the output ports delivering a signal;
    processing m digital signals, each of the digital signals being mainly determined by one and only one of the signals delivered by the output ports, to estimate one or more quantities representative of a channel matrix between a plurality of signals sent by a transmitter and the m signals delivered by the output ports, and to deliver a tuning instruction as a function of said one or more quantities representative of a channel matrix;
    using the tuning instruction to obtain one or more tuning control signals, the reactance of each of the adjustable impedance devices being mainly determined by one or more of the tuning control signals.

2. The method of claim 1, wherein each of the input ports is coupled, directly or indirectly, to one and only one of the N antennas.

3. A receiver for radio reception with multiple antennas using N antennas in a given frequency band, where N is an integer greater than or equal to 2, the receiver comprising:
    a multiple-input-port and multiple-output-port amplifier comprising n input ports, where n is an integer greater than or equal to 2 and less than or equal to N, m output ports, where m is an integer greater than or equal to 2, and p adjustable impedance devices, where p is an integer greater than or equal to m, each of the adjustable impedance devices having a reactance at a frequency in the given frequency band, the input ports presenting, at said frequency in the given frequency band, an admittance matrix referred to as the admittance matrix presented by the input ports, the reactance of any one of the adjustable impedance devices having an influence on the admittance matrix presented by the input ports, the reactance of any one of the adjustable impedance devices being adjustable by electrical means, each of the output ports delivering a signal;
    a multiple-input signal processing device processing m digital signals, each of the digital signals being mainly determined by one and only one of the signals delivered by the output ports, the multiple-input signal processing device estimating one or more quantities representative of a channel matrix between a plurality of signals sent by a transmitter and the m signals delivered by the output ports, the multiple-input signal processing device delivering a tuning instruction as a function of said one or more quantities representative of a channel matrix;
    a tuning control unit, the tuning control unit receiving the tuning instruction from the multiple-input signal processing device, the tuning control unit delivering one or more tuning control signals to the multiple-input-port and multiple-output-port amplifier, the tuning control signals being determined as a function of the tuning instruction, the reactance of each of the adjustable impedance devices being mainly determined by one or more of the tuning control signals.

4. The receiver for radio reception with multiple antennas of claim 3, wherein each of the input ports is coupled, directly or indirectly, to one and only one of the N antennas.

5. The receiver for radio reception with multiple antennas of claim 3, wherein the multiple-input signal processing device computes one or more quantities representative of a channel capacity as a function of said quantities representative of a channel matrix, and delivers the tuning instruction as a function of said one or more quantities representative of a channel capacity.

6. The receiver for radio reception with multiple antennas of claim 3, wherein an adaptive process is implemented during one or more training sequences.

7. The receiver for radio reception with multiple antennas of claim 6, wherein one of said training sequences comprises a plurality of quasi-orthogonal or orthogonal signals.

8. The receiver for radio reception with multiple antennas of claim 6, wherein the multiple-input signal processing device computes one or more quantities representative of a channel capacity as a function of said quantities representative of a channel matrix, and wherein, during each of said training sequences, said one or more quantities representative of a channel capacity are computed for a finite set of tuning instructions, and a tuning instruction is selected, the selected tuning instruction being a tuning instruction for which said one or more quantities representative of a channel capacity correspond to the largest channel capacity.

9. The receiver for radio reception with multiple antennas of claim 8, wherein the tuning instruction selected during the latest completed training sequence is used for reception.

10. The receiver for radio reception with multiple antennas of claim 3, wherein the reactance of at least one of the adjustable impedance devices has an influence on at least one non-diagonal entry of the admittance matrix presented by the input ports.

11. The receiver for radio reception with multiple antennas of claim 3, wherein the multiple-input-port and multipleoutput-port amplifier is such that, for a given tuning instruction, the admittance matrix presented by the input ports approximates a wanted admittance matrix, the wanted admittance matrix being a non-diagonal and invertible square matrix.

12. The receiver for radio reception with multiple antennas of claim 3, wherein the multiple-input-port and multiple-output-port amplifier has, at said frequency in the given frequency band, for a given tuning instruction, a voltage gain matrix approximating a specified gain matrix, the specified gain matrix being a non-diagonal square matrix.

13. The receiver for radio transmission with multiple antennas of claim 3, wherein the multiple-input-port and multiple-output-port amplifier comprises a multiple-input and multiple-output series-series feedback amplifier.

* * * * *